United States Patent [19]

Powell et al.

[11] Patent Number: 5,699,529
[45] Date of Patent: Dec. 16, 1997

[54] WORK STATION OR SIMILAR DATA PROCESSING SYSTEM INCLUDING INTERFACING MEANS TO A DATA CHANNEL

[75] Inventors: V. Thomas Powell, Moncks Corner, S.C.; Anton Goeppel, Burgau; Gerhard Roehrl, Stadtbergen, both of Germany; Edward C. King, Fremont, Calif.

[73] Assignee: NCR Corporation, Dayton, Ohio

[21] Appl. No.: 752,710

[22] Filed: Aug. 30, 1991

[30] Foreign Application Priority Data

Aug. 31, 1990 [GB] United Kingdom ............... 9019022

[51] Int. Cl.[6] ..................................................... H01J 1/00
[52] U.S. Cl. .......................... 395/250; 395/411; 395/310; 395/474
[58] Field of Search .................................. 395/325, 425, 395/725, 500, 275, 250, 775, 800, 411, 474, 310

[56] References Cited

U.S. PATENT DOCUMENTS

| 4,144,562 | 3/1979 | Cooper | 395/325 |
|---|---|---|---|
| 4,291,370 | 9/1981 | Charles | 395/325 |
| 4,375,665 | 3/1983 | Schmidt | 395/325 |
| 4,447,878 | 5/1984 | Kinnie et al. | 395/325 |
| 4,667,305 | 5/1987 | Dill et al. | 395/325 |
| 4,683,534 | 7/1987 | Tietjen et al. | 395/325 |
| 4,695,952 | 9/1987 | Howland | 395/325 |
| 4,716,525 | 12/1987 | Gilanyi et al. | 395/250 |
| 4,831,514 | 5/1989 | Turlakov et al. | 395/250 |
| 4,935,894 | 6/1990 | Ternes et al. | 395/325 |
| 5,003,463 | 3/1991 | Coyle et al. | 395/275 |
| 5,034,914 | 7/1991 | Osterlund | 395/425 |
| 5,043,937 | 8/1991 | Glaise et al. | 395/425 |
| 5,056,011 | 10/1991 | Yoshitake et al. | 395/725 |
| 5,068,785 | 11/1991 | Sugiyama | 395/325 |
| 5,077,655 | 12/1991 | Jinzaki | 395/200 |
| 5,099,417 | 3/1992 | Magar et al. | 395/425 |
| 5,107,456 | 4/1992 | Schuur | 395/325 |
| 5,113,513 | 5/1992 | Kawai | 395/425 |
| 5,121,485 | 6/1992 | Ujie | 395/325 |
| 5,129,065 | 7/1992 | Priem et al. | 395/325 |
| 5,134,701 | 7/1992 | Mueller et al. | 395/500 |
| 5,142,627 | 8/1992 | Elliot et al. | 395/425 |
| 5,163,132 | 11/1992 | DuLac et al. | 395/275 |
| 5,224,213 | 6/1993 | Dieffenderfer et al. | 395/250 |

*Primary Examiner*—Tariq R. Hafiz
*Attorney, Agent, or Firm*—Douglas S. Foote

[57] ABSTRACT

An interface circuit and method for transferring data between first and second buses. The circuit includes a buffer having a plurality of registers and write and read means. The write means stores data words received from the second bus in non-sequential registers. The read means transfers the data words from sequential registers to the first bus.

19 Claims, 15 Drawing Sheets

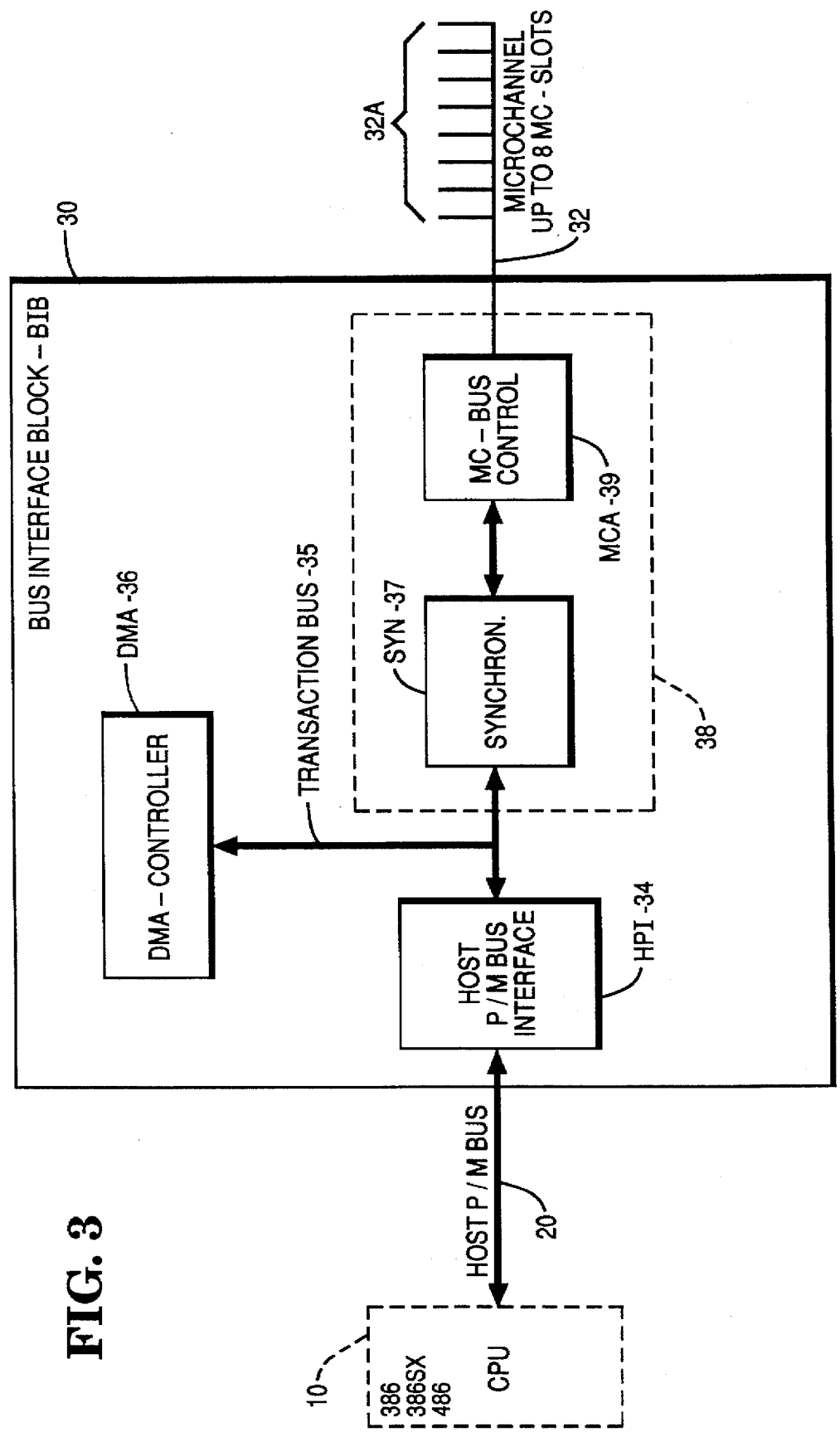

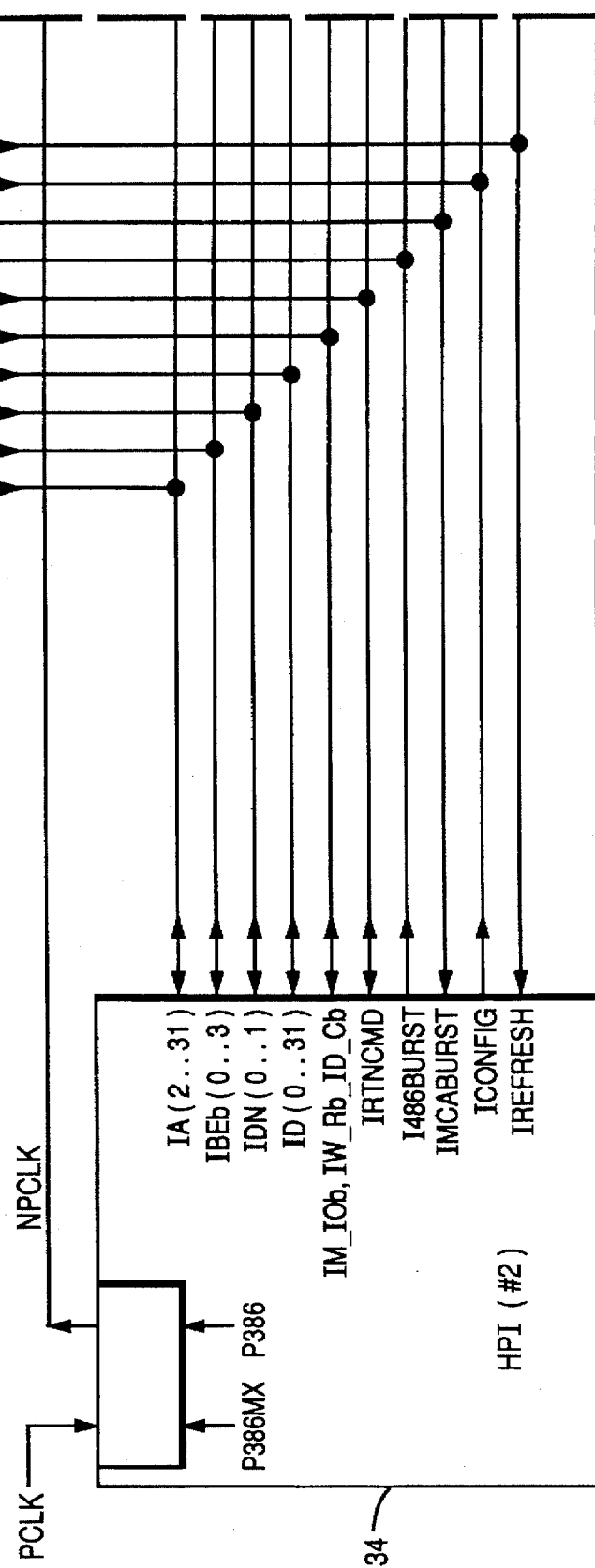

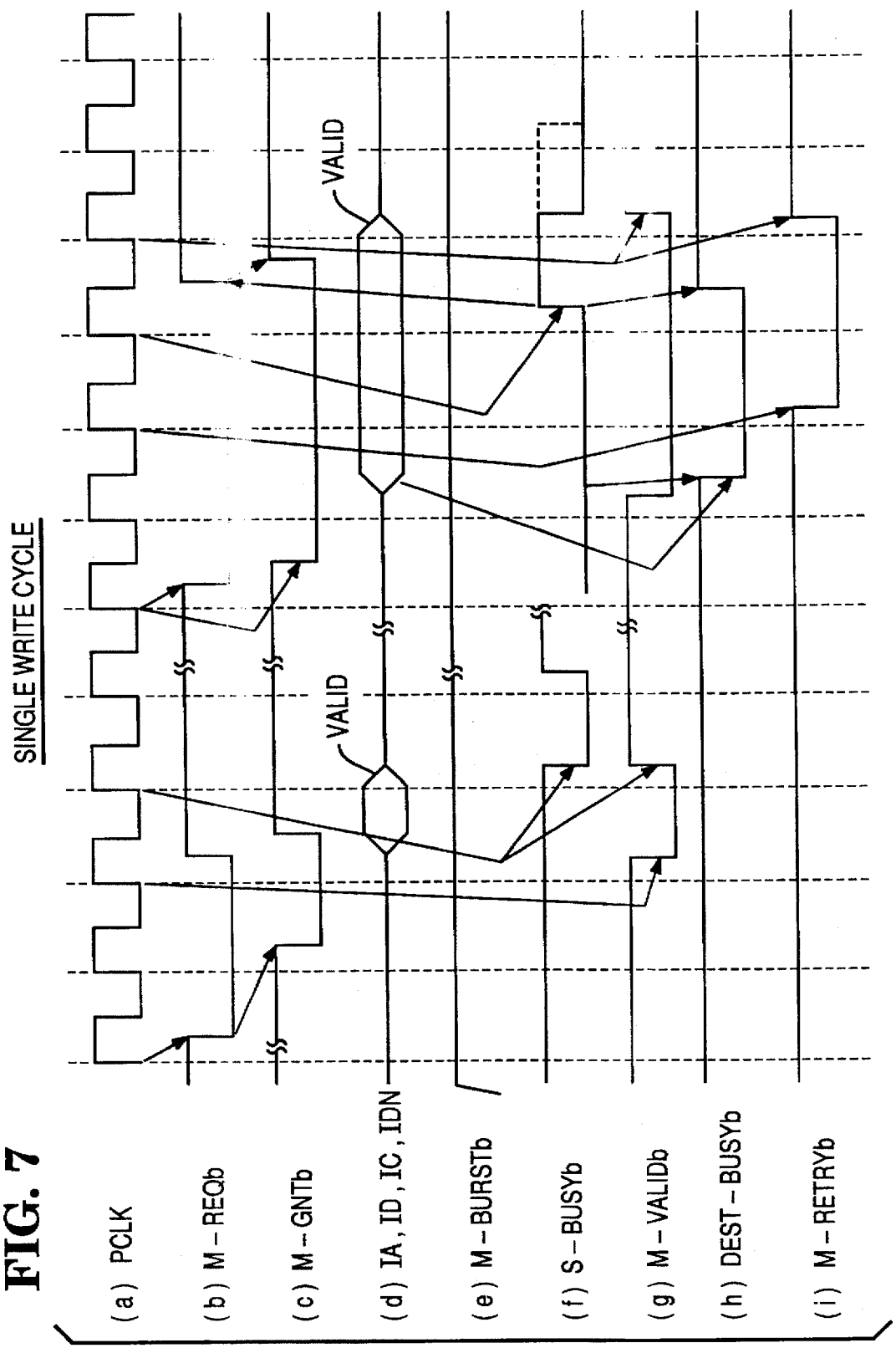

WORK STATION OR SIMILAR DATA PROCESSING SYSTEM INCLUDING INTERFACING MEANS TO A DATA CHANNEL

This invention relates to a work station or similar data processing system. More particularly, it relates to a system and method for transferring data between external and internal buses of the work station.

CROSS-REFERENCE TO RELATED APPLICATIONS

"Work Station Having Multiprocessing Capability", U.S. patent application Ser. No. 752,747, filed concurrently herewith, invented by Otto Duerrschmid and Edward C. King.

"Work Station Including a Direct Memory Access Controller and Interfacing Means to Microchannel Means", U.S. patent application Ser. No. 753,273, filed concurrently herewith, invented by Georg Dollinger and Edward C. King.

"Work Station and Method for Configuring Thereof", U.S. patent application Ser. No. 752,814, filed concurrently herewith, invented by Anton Goeppel.

"Work Station Interfacing Means Having Burst Mode Capability", U.S. patent application Ser. No. 752,383, filed concurrently herewith, invented by Edward C. King and Anton Goeppel.

"Internal Bus for Work Station Interfacing Means", U.S. patent application Ser. No. 752,371, filed concurrently herewith, invented by Edward C. King and Anton Goeppel.

"Work Station Architecture With Selectable CPU", U.S. patent application Ser. No. 752,819, filed concurrently herewith, invented by Edward C. King and Anton Goeppel.

"Register Control for Workstation Interfacing Means", U.S. patent application Ser. No. 752,727, filed concurrently herewith, invented by Anton Goeppel.

"Work Station Having Multiplexing and Burst Mode Capabilities", U.S. patent application Ser. No. 752,407, filed concurrently herewith, invented by Anton Goeppel and Edward C. King.

"Work Station Including a Direct Memory Access Controller", U.S. patent application Ser. No. 752,815, filed concurrently herewith, invented by Anton Goeppel.

BACKGROUND OF THE INVENTION

Many work stations and other data processing systems are designed with an internal bus interconnecting components like system memory, a central processing unit (CPU), etc. Some applications may require the internal bus of the work station to be connected to an external bus or data channel, such as a Micro Channel bus, which has different operating characteristics. Such different characteristics may include operating frequency, bus width, data transfer modes, etc. For example, Micro Channel has a "streaming mode" in which a plurality of data words, preceded by a single address word, may be transmitted or received.

OBJECTS OF THE INVENTION

It is therefore an object of the invention to provide improved a new and improved system and method for transferring data between data buses having different operating characteristics.

It is another object of the present invention to provide an interface circuit between a host CPU and a data channel to provide enhanced flexibility of the system.

It is a further object of the present invention to provide an interface to a Micro Channel bus which is compatible with Micro Channel streaming mode.

SUMMARY OF THE INVENTION

One form of the present invention is an interface circuit for transferring data between first and second buses. The circuit includes a buffer having a plurality of registers and write and read means. The write means stores data words received from the second bus in non-sequential registers. The read means transfers the data words from sequential registers to the first bus.

Another form of the present invention is a method for transferring a sequence of data words between data buses. Data words received from a second bus are sorted and stored in registers in a buffer. The data words are thereafter transferred, in their sorted order, from the registers to the first bus.

A work station in accordance with the present invention has improved flexibility in that it enables a host computer operating in a burst mode to communicate with a data channel operating in a so-called streaming mode, in which data is transferred at a very fast rate of up to 80 MB/second and in data blocks (64 bits long) which are twice the length of data words handled by the host computer.

In a work station in accordance with a preferred embodiment of the present invention, the write control means (write means) is arranged to cause each data word of a data burst transmitted by the data channel to be written into a selected register of the buffer, and the read control means (read means) is arranged to cause data words respectively stored in storage locations of the buffer to be read out in a predetermined sequence, whereby the order in which data words are read out from the buffer for application to the host computer may be different from the order in which these data words are transmitted from the data channel.

A work station in accordance with the preferred embodiment of the invention has further improved flexibility in that it enables communication between a data channel operating in the streaming mode and a microprocessor, such as an Intel 80486 microprocessor, which, when operating in the burst mode, requires to receive data words in a certain order.

One embodiment of the invention will now be described by way of example with reference to the accompanying drawings.

BRIEF DESCRIPTION OF THE DRAWINGS

FIG. 3 is a block diagram of a bus interface block BIB.

FIGS. 4A to 4D, arranged as shown in FIG. 4, are a schematic drawing showing in detail the various lines of an internal transaction bus of the BIB.

FIG. 7 is a timing diagram used for explaining operation of the work station for a single write cycle.

DESCRIPTION OF A PREFERRED EMBODIMENT

Figure 1:
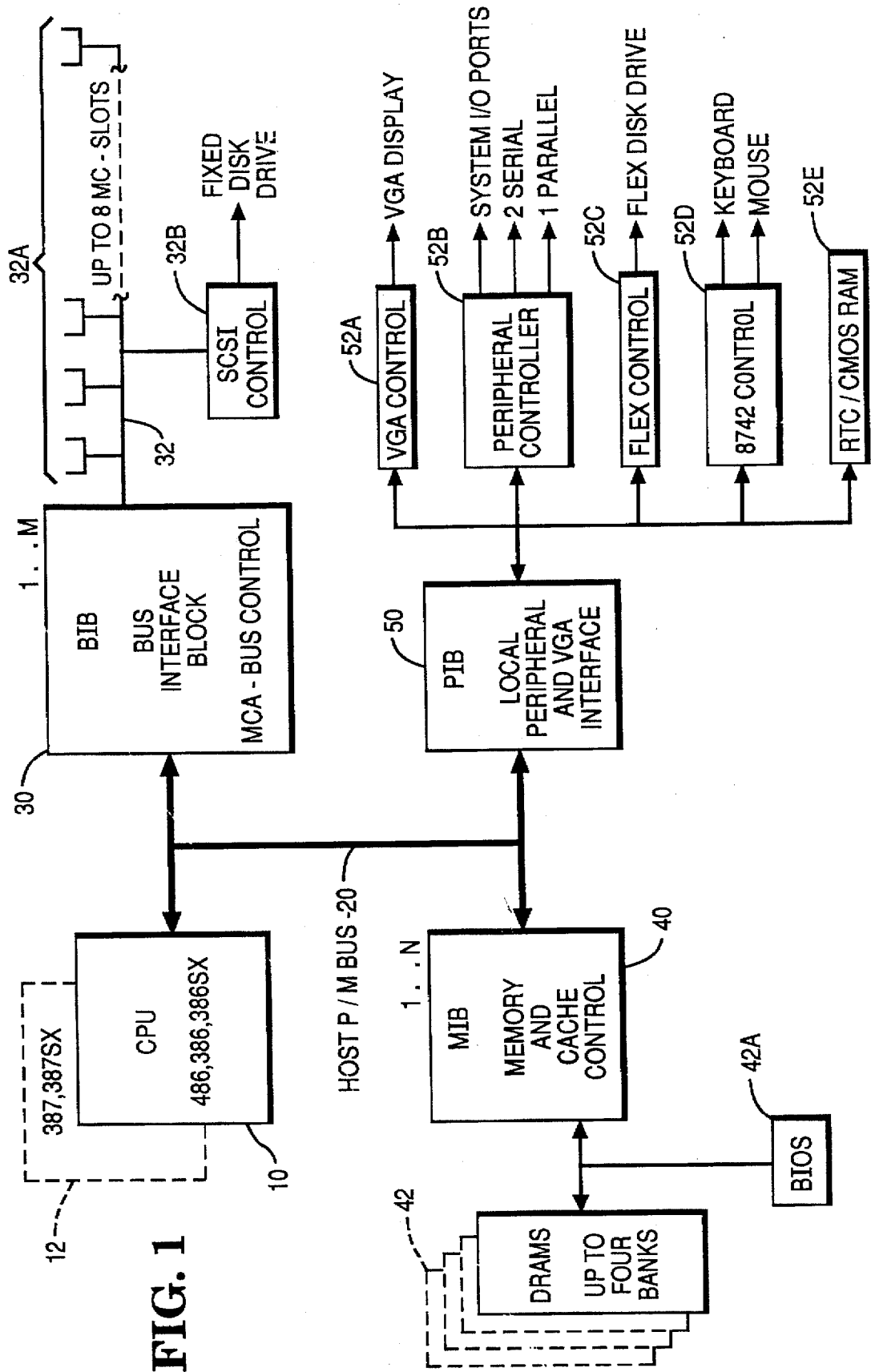
FIG. 1 is a schematic overall view of one embodiment of a work station according to the invention illustrating the various functional blocks of the work station and the connections therebetween.

FIG. 1 shows a preferred embodiment of a work station or data processing system according to the invention.

Basically, a CPU 10 communicates through a host P/M bus 20 with functional blocks 30, 40, and 50, and in particular with one or a plurality of bus interface blocks (BIB) 30 for data channel (Micro Channel bus) access, with one or a plurality of memory interface blocks (MIB) 40 for memory and cache control, and with a local peripheral and video graphics array (VGA) interface block (PIB) 50.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX may be added.

The functional block BIB 30 is provided as an interface between the host P/M bus 20 and a Micro Channel 32 provided with a plurality of slots 32a for attaching conventional input/output devices including adapter boards provided with a microprocessor which may act as a master in communication with other functional blocks of the work station. Also, an example of an adapter board is a circuit board carrying additional memory. Furthermore, a control 32b is connected to the Micro Channel 32 for controlling a fixed disk drive.

The functional block MIB 40 forms an interface between the host P/M bus 20 and a DRAM memory 42 which may have different sizes with a presently usual size of 16 MB up to 64 MB. Furthermore, the MIB 40 controls access to the usual BIOS ROM memory 42a.

The functional peripheral interface block PIB 50 (FIG. 1) forms an interface between the host P/M bus 20 and various conventional system and peripheral units through respective control blocks. All these units are well known in the art, and therefore they will not be described in further detail.

Each of the functional blocks BIB 30, MIB 40 and PIB 50 has been specifically designed as one microchip each containing all elements such as registers and logic circuitry necessary to establish and perform communication between the host P/M bus 20 and the individual units connected to each functional block 30, 40, and 50.

As indicated in FIG. 1 it should be noted that a plurality m of BIBs 30 and a plurality n of MIBs 40 may be provided all connected to the host P/M bus 20. Thus, a large variety of configurations with different CPUs and different memory capacities may be implemented. Each chip may be configured quite differently to match various configurations of the system.

Each functional block 30, 40, 50 is provided with some intelligence providing an operation which is relatively independent of the CPU operation generally governing all functions of the system, thus relieving the CPU from controlling data transfers between the functional blocks, such as between a BIB 30 and an MIB 40, and of many other procedures. As regards the MIBs 40, these blocks will organize refresh cycles for the DRAMs and overflow cleaning of caches included therein.

Basically, each functional block 30, 40, 50 includes an interface unit between the host P/M bus and an individual internal transaction bus. Though the timing is based on the CPU clock, all operations within a functional block such as read or write operations will be independently performed in one cycle whilst the CPU would need at least two cycles of the CPU clock. Accordingly, this type of system architecture offers a considerably improved performance in view of the reduction of wait states for the CPU, resulting in a higher overall operating speed.

Specifically referring to FIG. 3, the bus interface block BIB 30 shown therein comprises, preferably arranged on one microchip, a host P/M bus interface EPI 34 forming an interface between the host P/M bus 20 and an internal transaction bus 35 providing communication connections to an EMCA unit 38, which is an interfacing unit to at least one Micro Channel. The EMCA unit 38 includes a synchronizing unit SYNC 37 which is connected to an extended MCA bus controller or MCA unit 39 for access to the Micro Channel 32. Further details of the EMCA unit 38 will be explained hereafter in connection with FIGS. 5A and 5B.

Further connected to the internal transaction bus 35 is a DMA controller DMA 36 for controlling data transfer between a DRAM memory 42 and the Micro Channel 32 via an MIB 40 and the host P/M bus 20.

The work station offers high flexibility in respect of using one of various types of CPUs and a plurality of Micro Channels and DRAM memory units to be included in the system. This is in contrast with known work stations where a predetermined CPU communicates with one Micro Channel and one DRAM memory block only.

A specifically extended host P/M bus is illustrated in FIGS. 2A–2E in detail. Specifically, within the block CPU 10 the conventional input/output ports of a microprocessor, such as Intel 80386, etc., are listed as address ports A(2,. . . 23), data ports D(0,. . . 15), byte enable ports BEb (0,. . . 3), and an address status output ADSb which indicates that a valid bus cycle definition and address are available and which is driven active in the same clock as the addresses are driven. ADSb is active low. The system clock PCLK is generated by a clock oscillator 60 and supplied to the input port PCLK of the CPU 10 and the functional blocks BIB 30, MIB 40, and PIB 50. These and all other input/output ports of the CPU 10 and the signals presented there are conventional. Thus, they will not be explained in detail.

As may be gathered from FIGS. 2A–2E, the functional blocks BIB 30, MIB 40, and PIB 50 are provided with similar input/output ports as the CPU. However, there are several additional ports and associated bus lines connecting corresponding ports of the functional blocks and the CPU with each other such as CT (0 . . . 1) which is a combination of the two lines included in the host P/M bus indicating the type of processor (or functional block) which has access to the host P/M bus. BREQb (0 . . . 3) is a host P/M bus request signal with the assumption that four BIBs 30 may be provided each being connected with the PIB 50 by one request line. BGNTb (0 . . . 3) is a host P/M bus grant signal transmitted by the PIB 50 to one of the BIBs 30 having requested access to the host P/M bus by BREQb (0 . . . 3). SBURSTBLb is a signal generated by one of the functional blocks BIB 30 to temporarily halt the transfer in burst mode but keeping the burst condition established. CIN and COUT are input/output signals used in a system configuration routine.

Figure 4B:
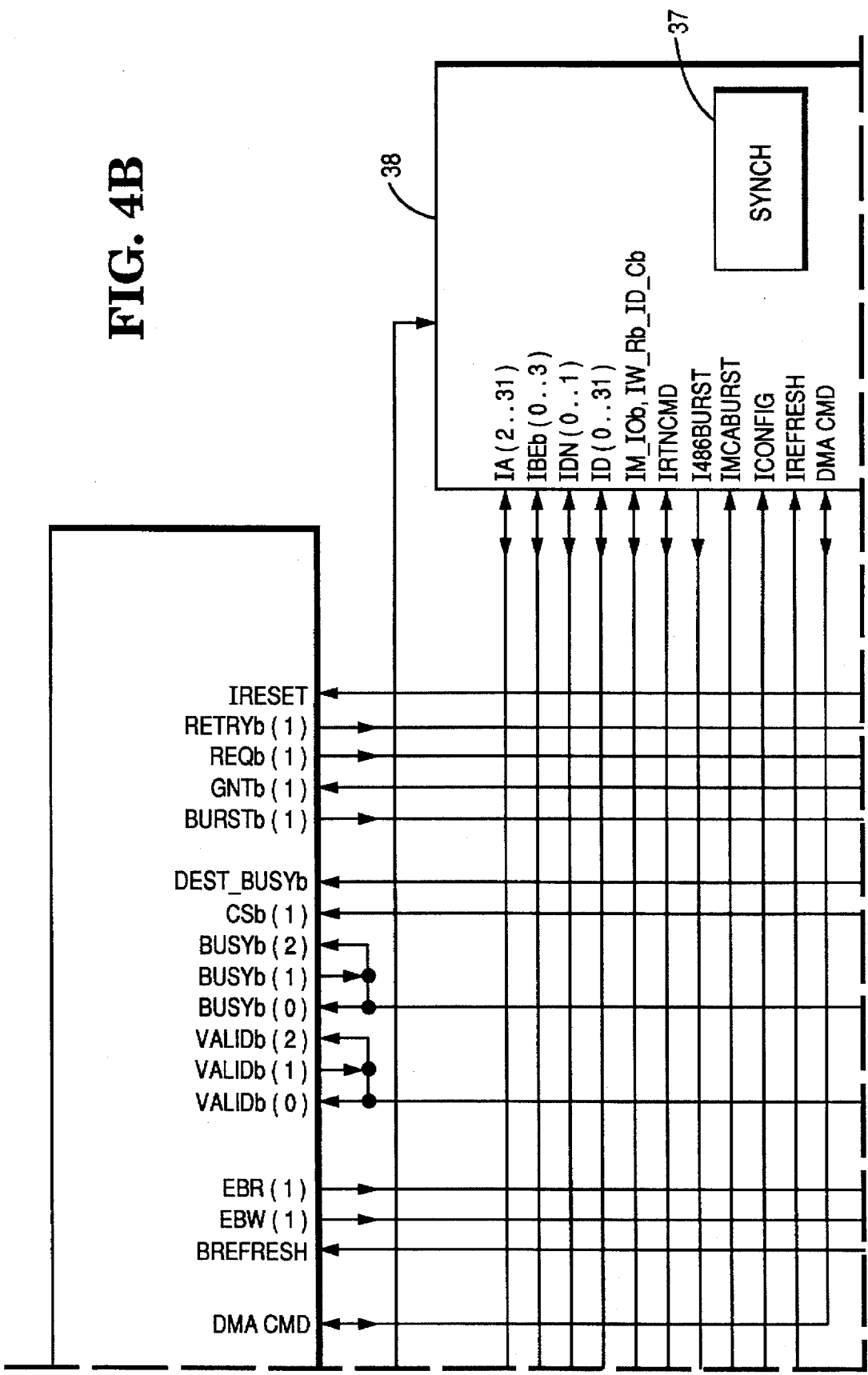

Particularly referring to FIGS. 3 and 4, the specific design of one functional block will be explained taking a BIB 30 as an example.

As mentioned before, the functional block BIB 30 basically comprises unit HPI 34, DMA controller 36, SYNC unit 37, and MCA unit 39, which according to FIGS. 4A–4D is actually combined with EMCA unit 38. These three units communicate with each other through the internal transaction bus TRACT 35 in a similar manner as the CPU 10 and the functional blocks BIB 30, MIB 40, and PIB 50.

Accordingly, the BIB 30 is a self-contained functional block performing several functions without control of the CPU 10 or another bus master.

Figure 2A:
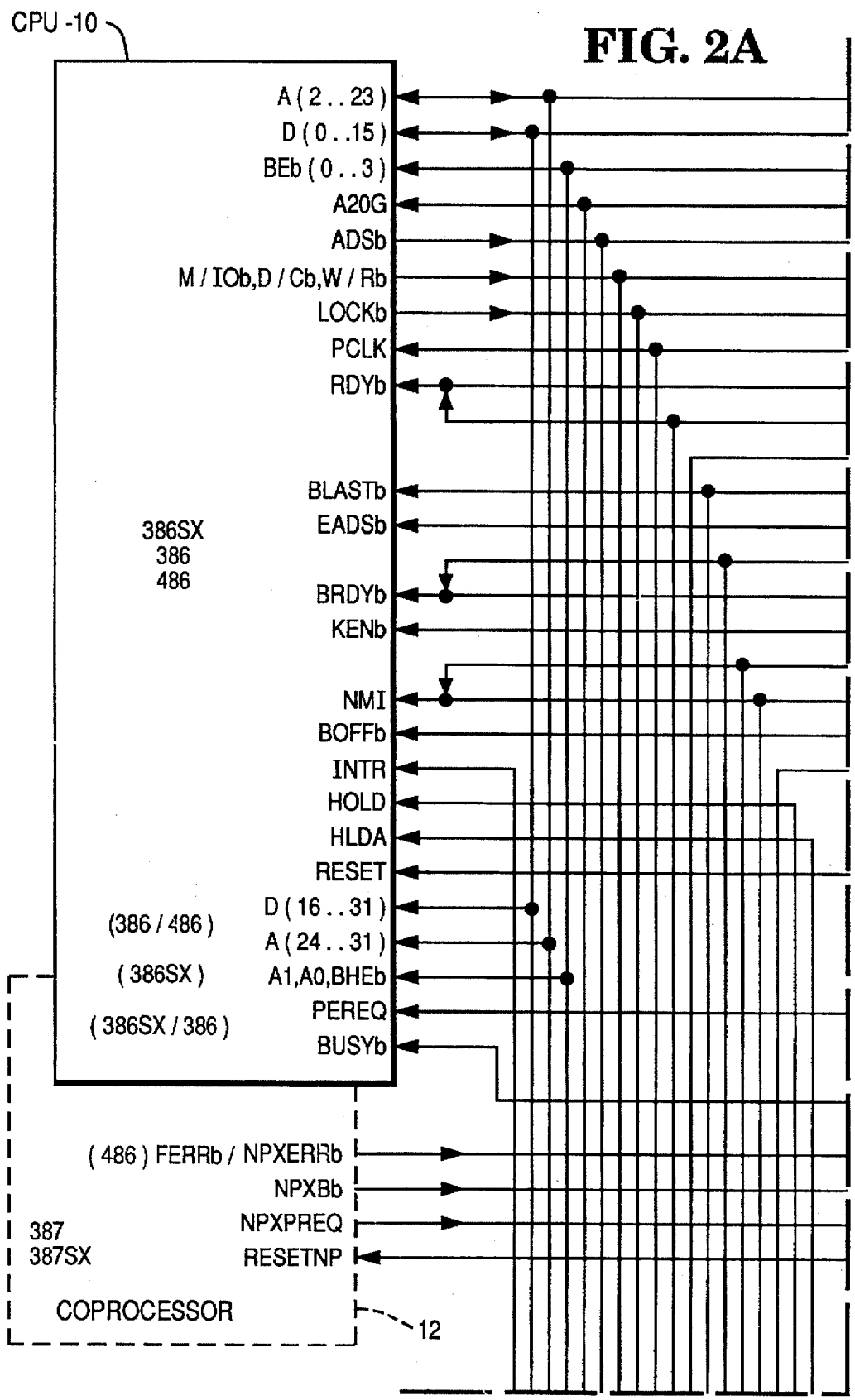
FIGS. 2A to 2E, arranged as shown in FIG. 2, are a schematic drawing showing in detail a host P/M bus as used to connect the various functional blocks with each other.
Figure 2B:
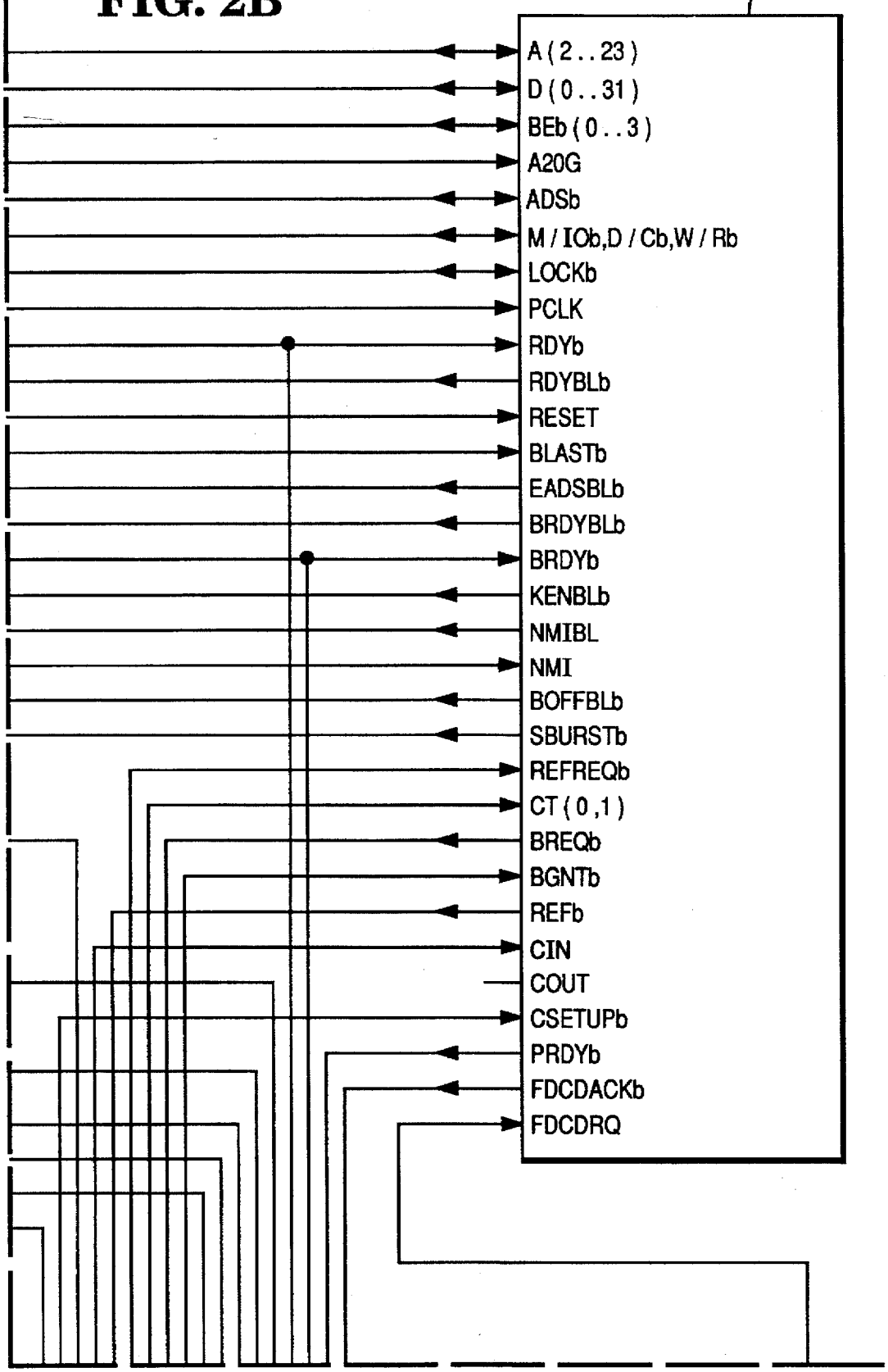
Figure 2C:
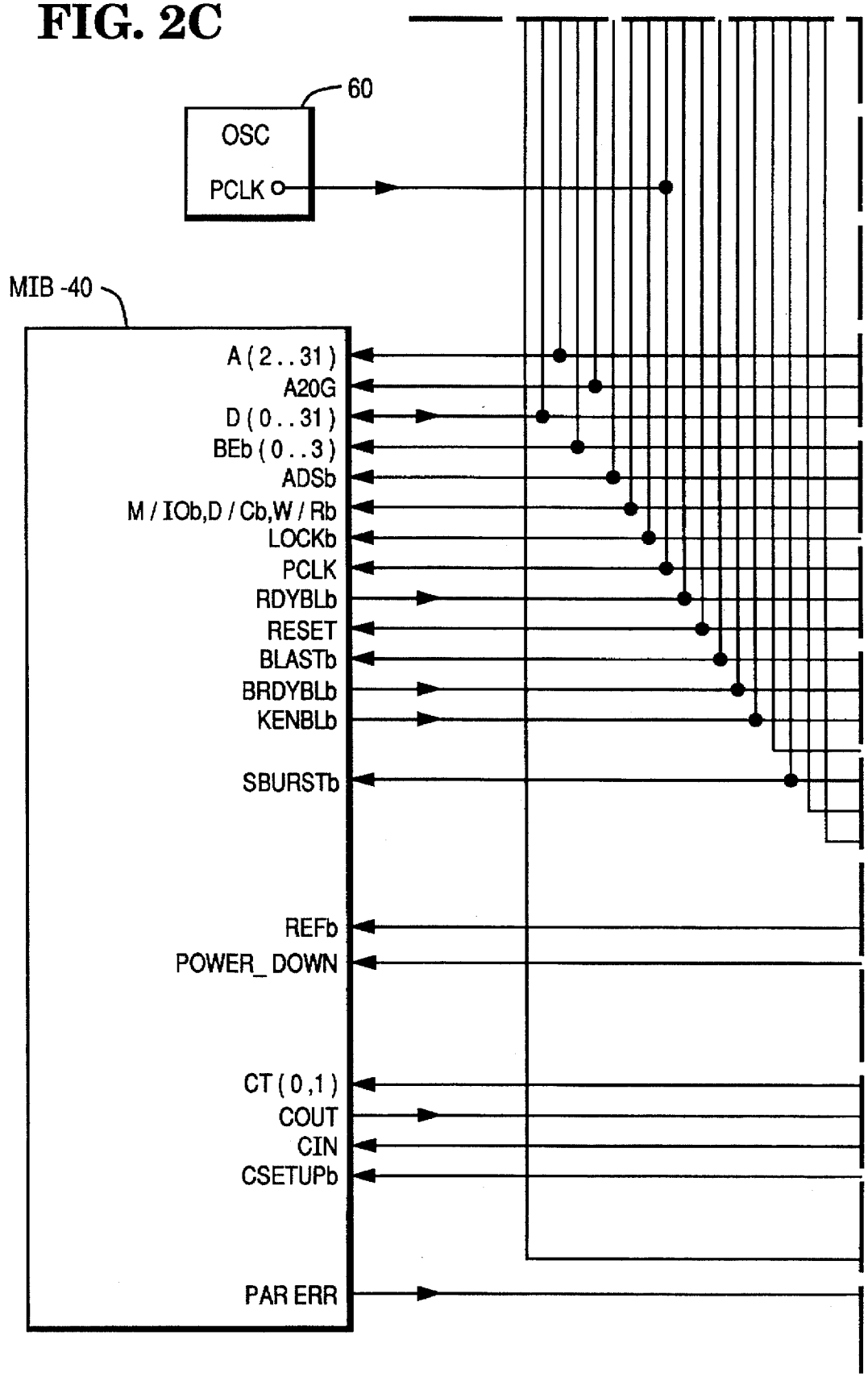
Figure 2D:
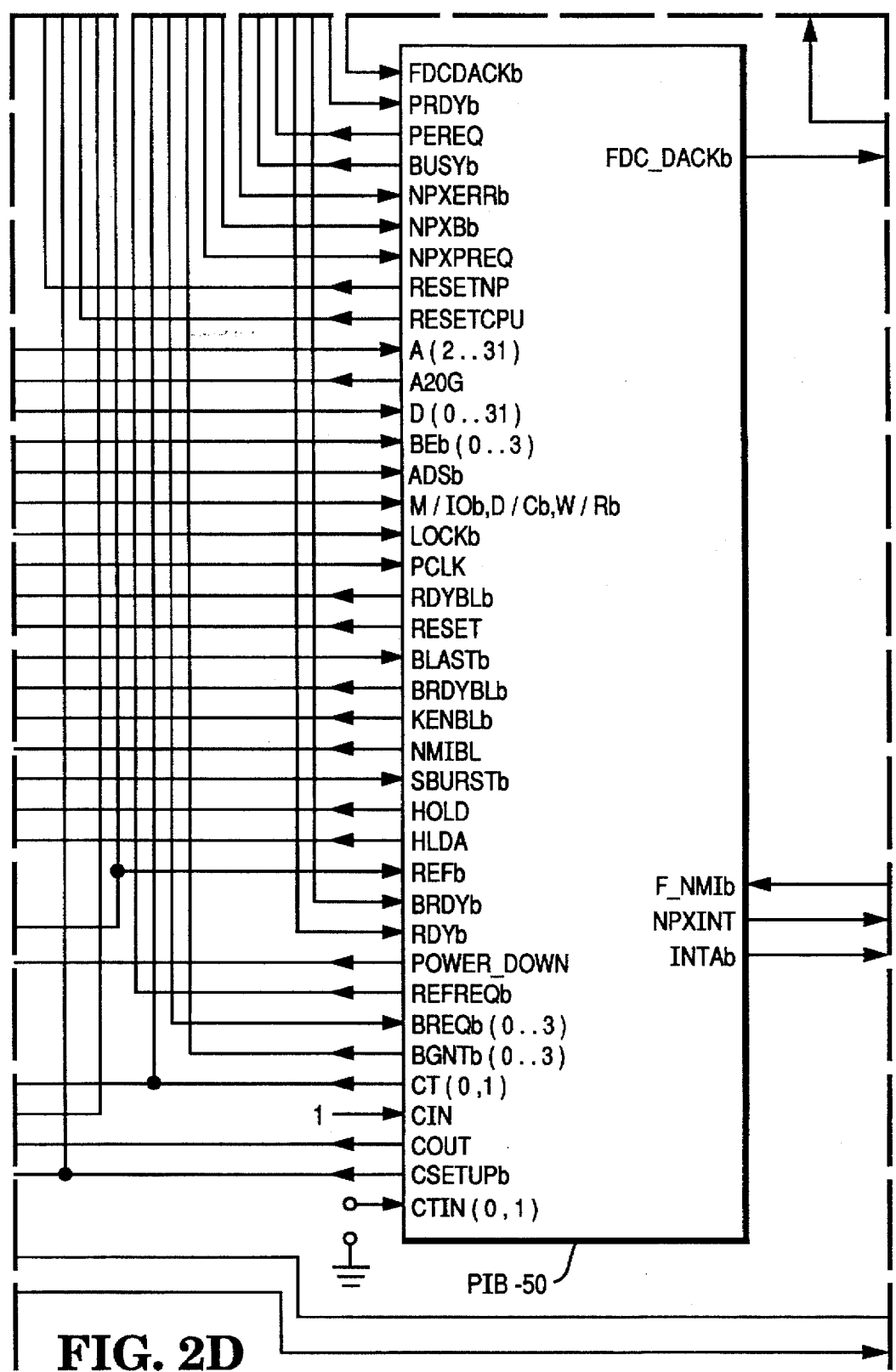
Figure 2:
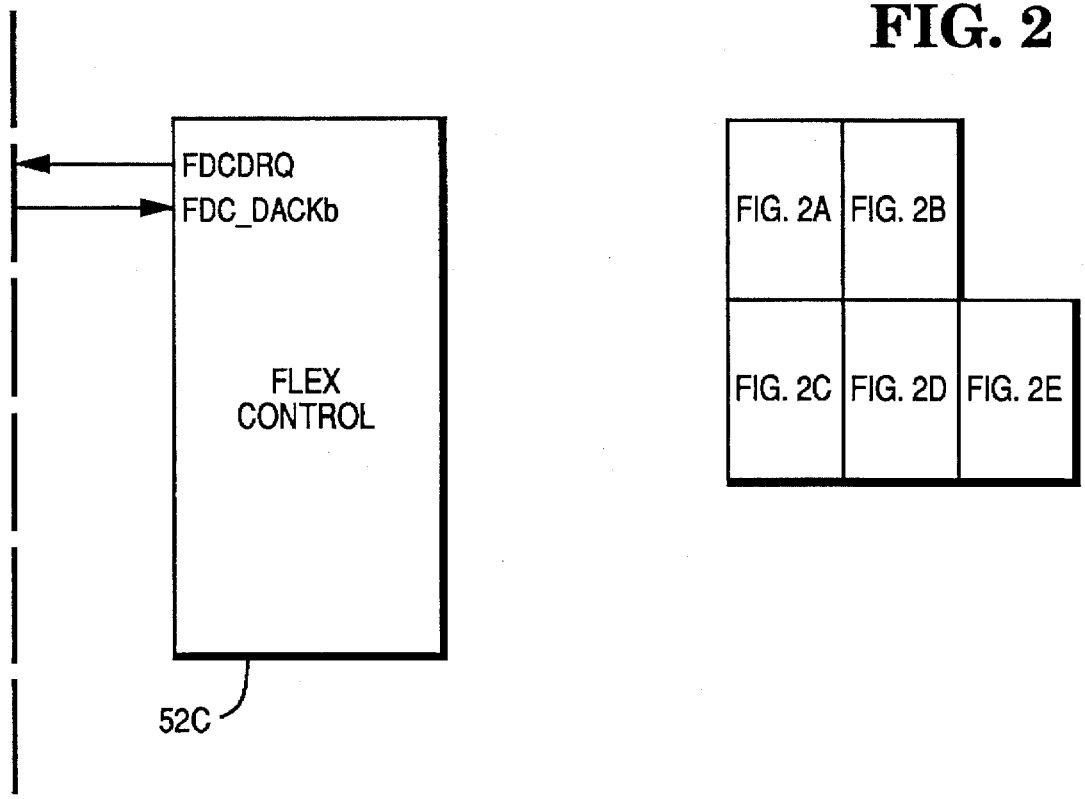
Figure 2E:
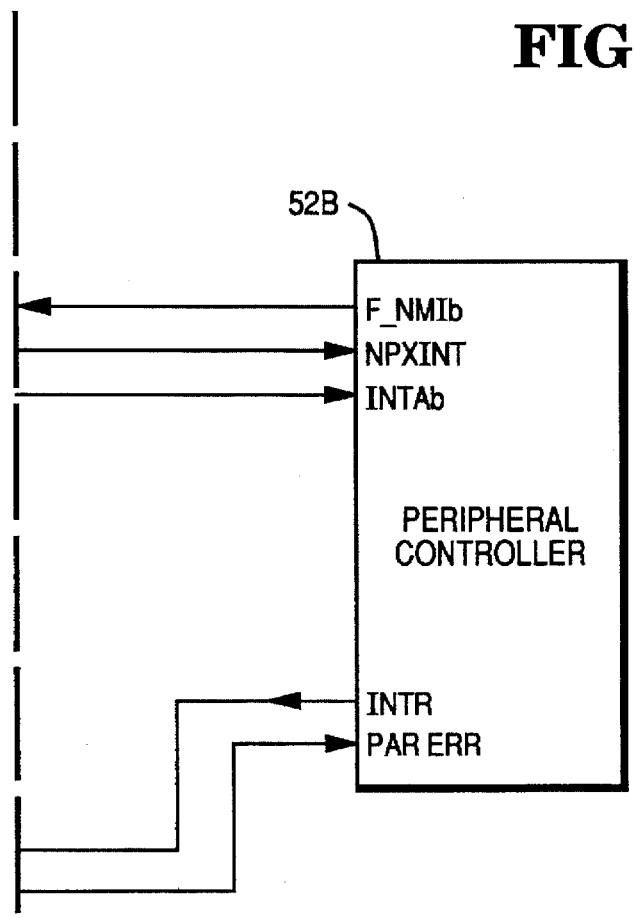

A comparison of FIGS. 4A–4D with FIG. 2 shows close similarities of the signals and corresponding lines on the host P/M bus and internal transaction bus 35.

Each unit 34, 36, 38 connected to the TRACT bus 35 has a VALID signal, a REQUEST signal, a GRANT signal, and a BURST signal. Each unit has an ID number according to priority with "0" the highest priority. Specifically, EMCA 38 has assigned #0, DMA 36 has assigned #1, and HPI 34 has assigned #2.

In the following Table 1 the main signals of TRACT 35 are listed.

Table 1

IA(2:31): Internal Address Bit 2 to 31.
IBEb(0:3): Internal Byte Enables 0 to 3.
IDN(0:1): Block ID-Number (maximum number of blocks is 4).
ID(0:31): Internal Data Bits 0 to 31.
VALIDb(n): The valid signal of the unit #n is driven by unit #n at the time when the address, data, and command on the TRACT bus 35 are valid.
BUSYb(n): The busy signal of the unit #n becomes active at that time, when the unit #n gets busy. It allows also to stop data transfer temporarily during burst mode. The burst mode remains active in that case.
REQb(n): The request signal of unit #n is driven by unit n.
GNTb(n): The grant line is driven by the internal arbiter 66.
BURSTb(n): The burst line is driven by a unit #n which currently has got a grant and wants to keep the transaction bus 35 for multiple accesses without intermission.
CSb(n): The chip select line is driven by a address decoder 64. Each functional block has its own chip select signal.
RETRYb(n): When a master unit #n tries to get access to a slave unit which is currently busy a retry signal is generated by that master. This retry signal is used to reorder the priority on the transaction bus 35.

Broadcast Signals

NPCLK: Clock signal for all transactions on the transaction bus 35. The system's CPU 10 runs with the same clock. The reference for all cycles is the rising edge of this clock.
IRESET: Internal reset for all units 34, 36, 37.
DEST-BUSYb: Indicates that the slave unit of the current transaction bus cycle is busy.
VALIDALLb: Combination of all VALIDb signals. This signal indicates to an addressed slave unit the presence of a valid cycle on the TRACT bus.

Figure 4C:
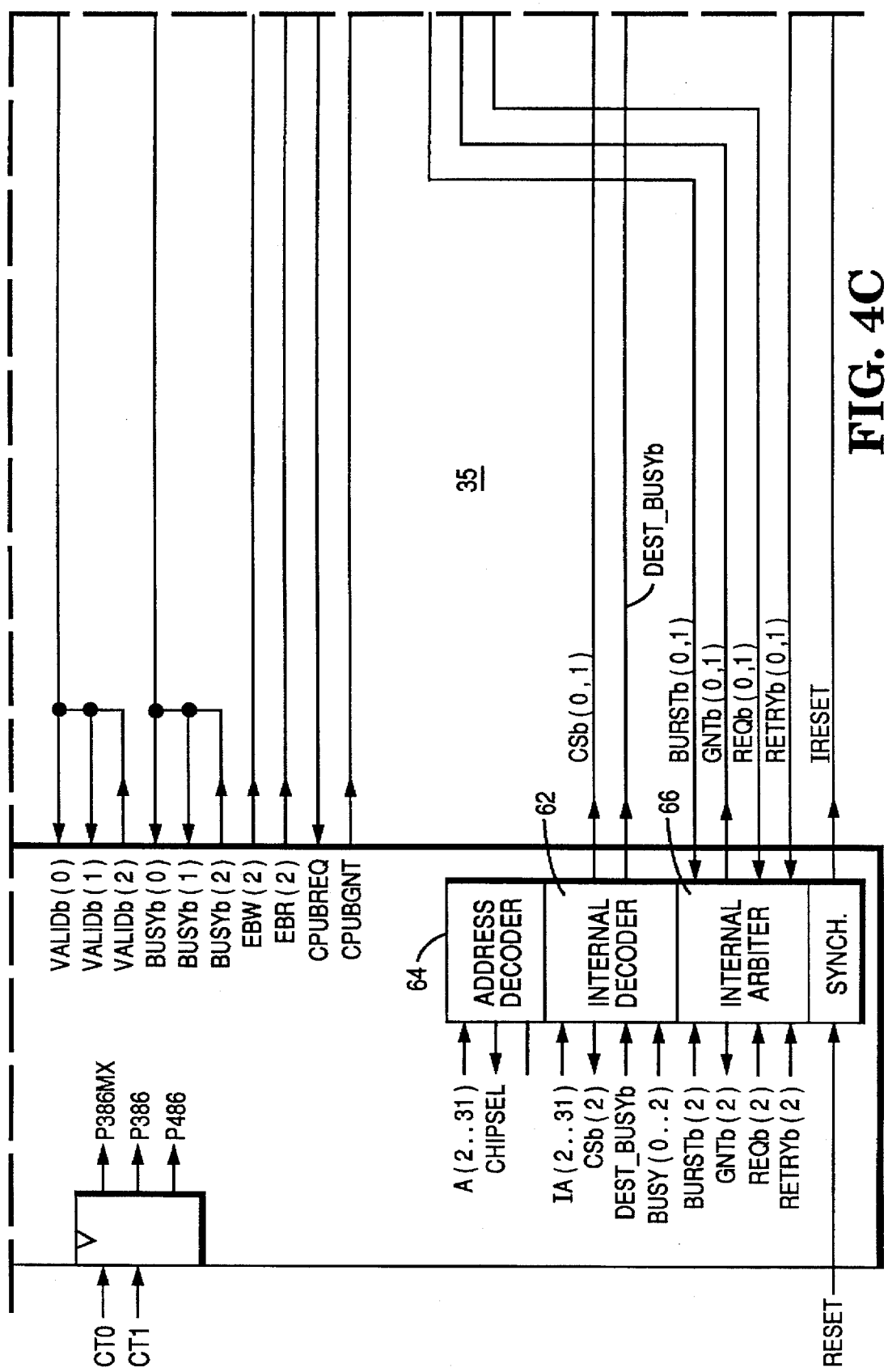
Figure 4D:
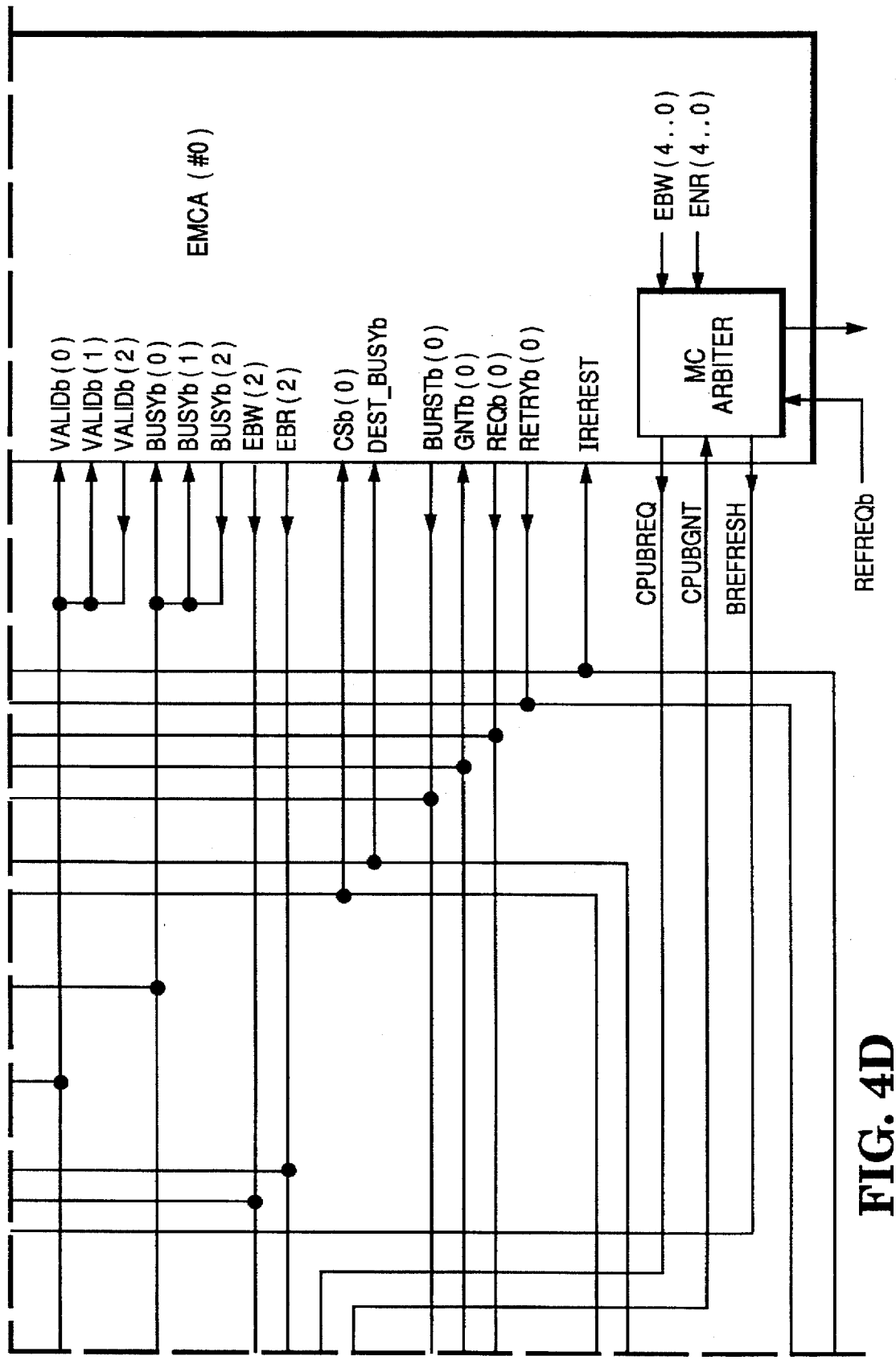

Referring particularly to FIG. 4C, HPI 34 includes an internal decoder 62 which uses the IA2 to IA31 lines to decode the access to the individual units. Every unit has its own address decode signal. This signal is generated for both memory or I/O accesses and all other commands a unit may receive. Also, the internal decoder 62 receives the busy signals of all units such as DMA 36 and EMCA 38 and generates the DEST-BUSYb signal.

Furthermore, the address decoder 64 is provided for receiving the address signals A2 to A31 from the host P/M bus 20 (see FIGS. 2 and 3) and generates the CHIPSEL signal indicating that the corresponding functional block such as BIB 30 has been selected for communication through the host P/M bus 20.

Of particular interest is the internal arbiter 66 included in the HPI 34. To get access to the TRACT 35, a unit such as HPI 34, DMA 36, and EMCA 38 has to assert a request by generating a request signal REQb (0 . . . 2) to TRACT 35. Several requests may occur simultaneously. Thus, it is the task of the internal arbiter 66 to resolve these requests and to generate a grant signal GNTb (0 . . . 2) for the requesting unit with the highest priority. As mentioned before, in the preferred embodiment EMCA 38 has the highest priority "0" while the HPI 34 has the lowest priority "2". The unit which detects its grant signal at the rising edge of the clock has access to the TRACT 35 for the next cycle.

Another task of the internal arbiter 66 is to handle a burst mode in which there are transmitted a plurality of data words preceded by a single address word. If a unit has detected its grant signal and wishes to carry out multiple data transfers on the TRACT 35, then this unit activates its burst line. For example, if EMCA 38 has requested access to the TRACT 35 by signal REQb(0) and has received access by the internal arbiter 66 transmitting the grant signal GNTb(0) to the EMCA 38, the latter will generate its BURSTb(0) signal for multiple data transfer. When the burst line is activated, the current grant is kept active regardless of requests of any other unit for bus access. Also, the internal arbiter 66 receives the RETRYb(0 . . . 2) signals of all units and uses them for reordering the priority for the next cycle.

It should be mentioned that on the TRACT 35 all cycles are synchronous with the clock PCLK on the host P/M bus 20. All clock dependent timing is based on the rising edge of PCLK. This means that the action which refers to PCLK occurs after the next rising edge. That unit, such as DMA controller 36, initiating a cycle on the TRACT 35 is called "master". Therefore, some of the control signals generated by a "master" are preceded by "M". The unit responding to that cycle is called "slave". Thus, some signals generated by a "slave" are preceded by "S". For example, with the DMA 36 requesting data transfer from the Micro Channel 32 to the DRAMs 42 through host P/M bus 20 and MIB 40 the DMA 36 initiates a corresponding cycle on the TRACT 35 for internal communication with HPI 34. A "b" at the end of a signal name means that this signal is active low.

In FIGS. 4A–4D some of the lines of the internal transaction bus, i.e. TRACT 35, have assignments starting with "I" such as IA(2 . . . 31) or ID(0 . . . 31) in order to distinguish them from similar lines of the host P/M bus 20 such as A(2:31) or D(0 . . . 31) for addresses and data, respectively.

Prior to entering into a detailed description of the synchronizer according to the invention it appears useful to briefly indicate the operation within the BIB 30 for a single write cycle as an example.

Basically, it is assumed that the DMA 36 wishes to write data from a Micro Channel device to the DRAMs 42 which is accomplished through the host P/M bus 20 and MIB 40. However, in order to get access to the host P/M bus 20, the address and data are transmitted to HPI 34 forming the interface to the host P/M bus 20 (see FIG. 3).

Write cycles consist of one transfer on the TRACT 35 only. A valid address, data, and command are issued on the TRACT 35 at the same time.

In FIG. 7, line (a) represents the CPU clock PCLK governing the timing of all cycles to be performed. As a first action according to line (b), DMA 36 generates the M-REQb signal going active low which signal is transmitted to the internal arbiter 66 (FIG. 6) which after arbitration returns the M-GNTb signal to DMA 36 according to line (c).

As may be seen from line (d) the following information is presented simultaneously, i.e. in parallel on the lines of TRACT 35: an address IA on address lines IA2 to IA31; data ID(0 ... 31) on lines ID0 to ID31; the unit identification number IDN on two lines IDN(0:1), i.e. for the present example "01" for the DMA 36; and a command IC, specifically on lines IC0, IC1, and IC2 indicating a memory or I/O data write access.

A comparison of lines (d) and (g) of FIG. 7 indicates that DMA 36 generates a M-VALIDb signal for the time the information according to line (d) is presented on TRACT 35. Every unit has a valid line. This line is activated when the master unit detects a GRANT and puts valid address, data, and command on the TRACT 35. As long as address, data, and command are valid the VALIDb signal is active.

A VALIDb signal can be activated even if the receiving unit is currently busy. In this case the TRACT 35 and the valid signal have to remain activated until the receiving unit resets its BUSY line. Then the master can deactivate VALIDb and release the TRACT 35 on the next rising edge. The signal M-BURSTb according to line (e) inactive high indicates the situation that no burst mode operation is intended. Line (f) illustrates the S-BUSYb signal going active low generated by the HPI 34 as a slave indicating the taking-over of the information according to line (d) for presenting it to the host P/M bus 20 independent of the further operation within the BIB 30. Every unit has its own busy line. The busy line is used to tell other units that a unit can not accept a new command.

BUSYb is activated only if a unit has received a command which requires more than one clock cycle to be finished. In this case busy is activated immediately on the rising clock edge after a unit received a valid command.

As long as a unit's BUSYb is deactivated the unit is able to accept a new command from the TRACT 35 on the next rising edge of the clock. Busy is deactivated one clock before completion of the command.

As regards the situation illustrated in the right-hand part of FIG. 7, this differs from that illustrated in the left-hand part in that there is a delay due to the fact that the address slave unit, i.e. HPI 34, is busy in the current TRACT bus cycle. Accordingly, the signals illustrated in the lines (b), (c), (d), and (g) are extended until the DEST-BUSYb signal, line (h) generated from the internal decoder 62 of the HPI 34 and indicating the busy signal goes inactive high again.

With the M-RETRYb signal according to line (i), DMA 36 may influence the internal arbiter 66 to rearrange priority.

Referring now specifically to FIGS. 3, 4, and 5, there will be explained further details of the EMCA unit 38 which is specifically designed according to the invention.

Basically, the EMCA unit 38 incorporates the logic to interface the internal transaction bus TRACT 35 of the BIB 30 with the extended Micro Channel bus 32. Thus, the EMCA unit 38 generates a CPU independent timing for the Micro Channel 32.

Figure 5A:
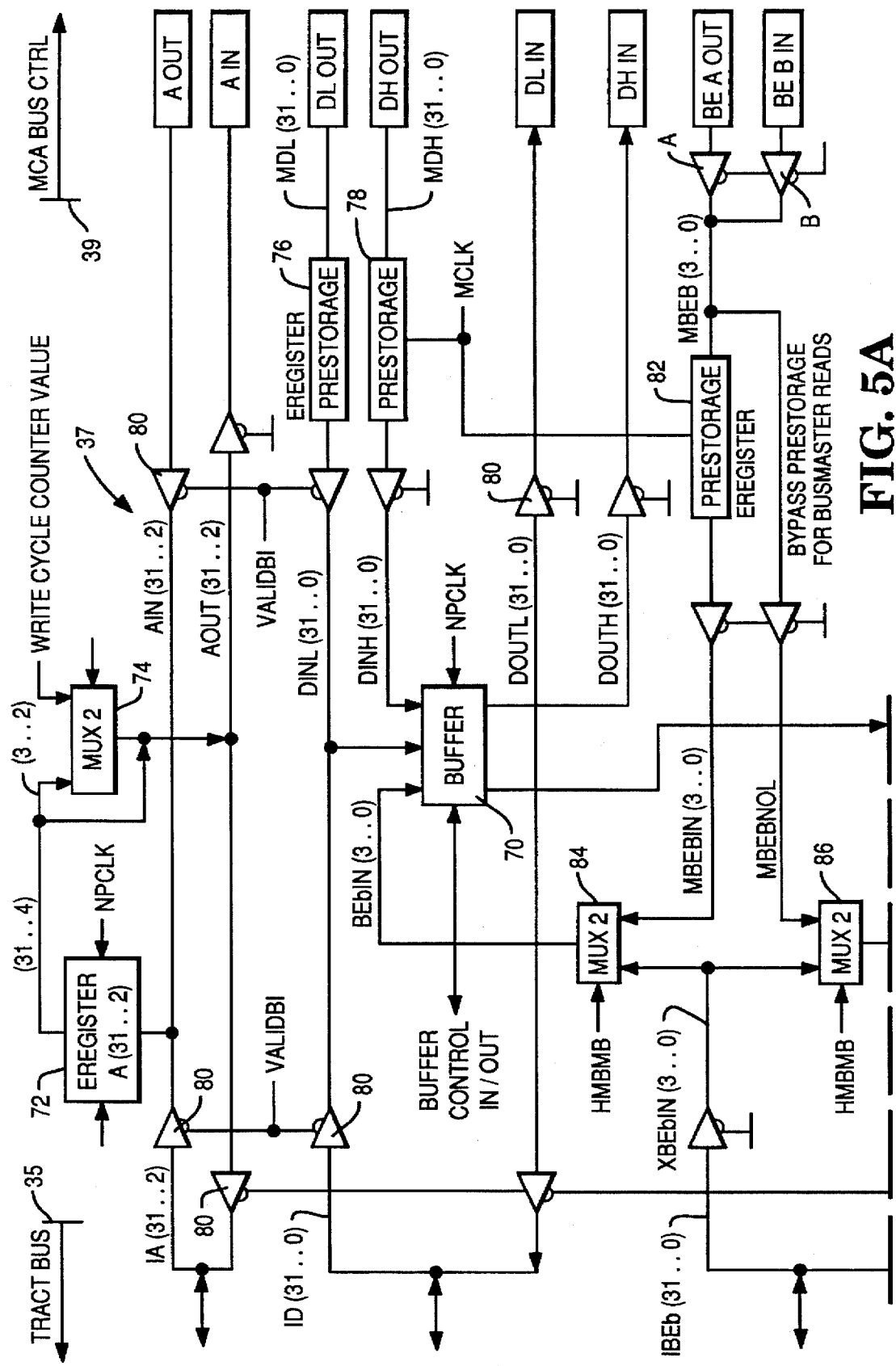
FIGS. 5A and 5B are a block diagram of a synchronizer used in the BIB.
Figure 5B:
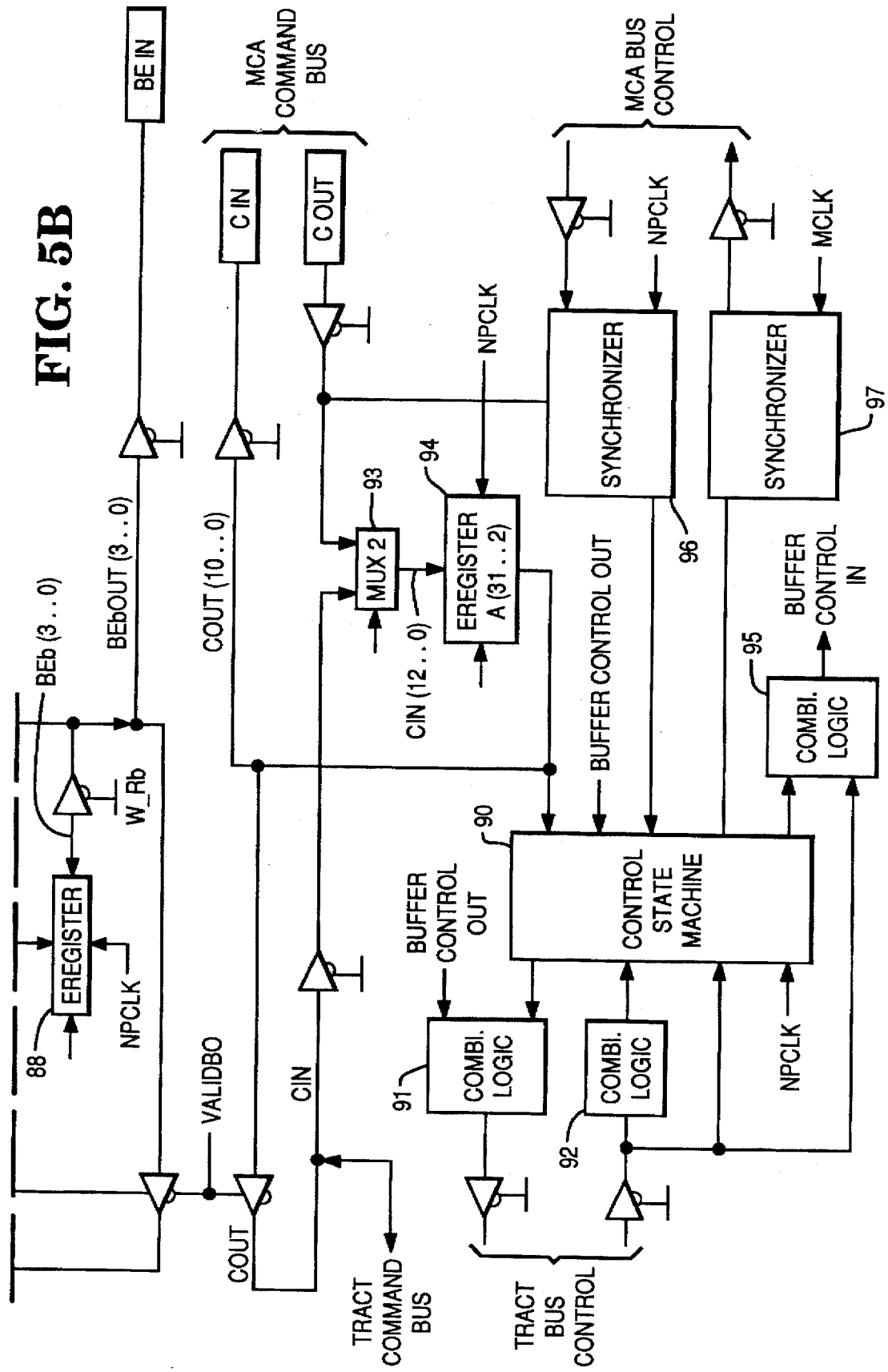

FIGS. 5A and 5B show the synchronizer 37 of the preferred embodiment of the invention in more detail. Specifically, it should be understood that the synchronizer 37 interfaces the internal transaction bus TRACT 35 (left-hand side of FIG. 5A) of the BIB 30 (FIGS. 3 and 4) with the MCA unit 39 (right-hand side).

The main function of the synchronizer 37 is to compensate for the different operating frequencies of the CPU 10 and the Micro Channel 32, and to buffer data in order to smooth data transfer, and enhance the flexibility of the system.

Specifically, the synchronizer 37 synchronizes transfers between the MCA unit 39 and the internal transaction bus TRACT 35 of the BIB 30. This is particularly necessary since the MCA unit 39 is clocked at 40 MHz, regardless of the CPU frequency which may operate at varying frequencies between 20 MHz and 33 MHz, for example. In addition, the synchronizer 37 provides buffering of EMCA streaming data which means data transmitted at a very fast data rate of up to 80 MB/second in blocks of 64 bits. This is done by a buffer 70 comprising eight registers each having a width of 68 (64+4) bits.

As will now be explained, the synchronizer 37 includes four internal bus pairs. All the signals entering or leaving the synchronizer SYNC 37 are buffered. Some of these buffers are constantly enabled.

As may be seen on the left-hand side of FIG. 5A, the address bus IA(31:2) of the TRACT 35 which is bi-directional communicates with an address bus pair split into an input address bus ain(31:2) and an output address bus aout(31:2). The input and output address buses are connected to latches Aout and Ain of the MCA unit 39.

It should be generally noted that the direction of data flow is determined by drivers 80 driven by corresponding control signals for data input and output validbi and validbo.

Data lines ID(31:0) of the TRACT 35 communicate via the internal bus lines dinl(31:0), doutl(31:0), and douth (31:0), partially through appropriate prestorage Eregisters 76, 78, with corresponding latches DLout, DHout, DLin, DHin of the MCA unit 39, with DL indicating the lower portion of data comprising 32 bits and DH referring to the higher portion of data of 32 bits.

The IBEb(3:0) lines of the TRACT 35 for the byte enable signals communicate with the internal synchronizer bus lines bebin(3:0) and bebout(3:0) and through some additional circuitry to be explained later, such as the multiplexers MUX2 84 and 86 and further Eregisters 82, 88 with corresponding latches BEAout, BEBout, and BEin of the MCA unit 39.

Similarly, the TRACT 35 command bus Cout and Cin communicates through the internal synchronizer bus lines cout (10:0) and cin (12:0) and a multiplexer MUX2 93 with the corresponding latches cin and cout of the MCA unit 39.

The control portion of the synchronizer 37 mainly comprises a control state machine 90 connected to the TRACT 35 control through some combinational logic circuitry 91, 92 and 95. Also communicating with the control state machine 90 are synchronizing circuits 96 and 97.

The control input portion of the internal synchronizer bus further includes an Eregister(12:0) 94.

A most important unit of the synchronizer 37 is the buffer 70 connected to the data input lines and data output lines dinl(31:0), dinh(31:0), doutl(31:0), and douth(31:0), and to the internal byte enable lines bebin(3:0) and bebout(3:0).

It should be noted that there are two clock signals, i.e. the CPU clock NPCLK and the Micro Channel clock MCLK with the data and byte enable signals presented by the MCA unit 39 through the prestorage registers 76, 78, 82, clocked by the Micro Channel clock MCLK, and with the input/ output of the buffer 70 clocked by the CPU clock NPCLK. Therefore, this provides an independent timing between the CPU 10 and the Micro Channel 32, independent of the operating frequency selected for the CPU 10, with usually the MCLK having a higher frequency (such as 40 MHz) than the CPU clock (between 20 MHz and 33 MHz). The buffer 70 has an excellent buffering capability smoothing out considerable time differences and interruptions in data transfer such that an optimum continuity is achieved. Also, the buffer 70 provides the system with considerable flexibility.

After having explained the main structure of the synchronizer 37, some more details will be given in respect of the function thereof.

As mentioned before, the address bus IA(31:2) of the TRACT 35 is connected to the bi-directional internal address bus of the synchronizer 37. The gating of the addresses is controlled by the signal called validbi which means "let addresses enter" from the TRACT 35 into the SYNC 37, and by the signal validbo which means "issue an address" on to the TRACT 35.

It should be noted that the aout bus is always connected to the MCA input latches Ain to ensure no floating inputs at the MCA inputs. The output address value of the MCA output latches Aout is gated on to the ain bus whenever no valid address is gated in from the TRACT 35.

If a valid command is issued from the TRACT 35 to the SYNC 37 then the address from the ain bus is stored in the Eregister 72, the output of which is connected to the aout bus; hence the incoming address is passed on to the aout bus just after storing the address value in the Eregister 72.

The lower two address bits aout (2) and aout (3) are multiplexed by means of a multiplexer MUX2 74 with a 2-bit counter output for providing a proper start address for a burst lead cycle. The SYNC 37 provides the proper start address for an MCA slave device which is not able to return the data in a streaming mode to the SYNC 37.

Whilst the lower 32 bits of the internal synchronizer data bus, i.e. dinl(31:0)/doutl(31:0), are controlled in the same way as the address bus described above, the upper 32-bit internal synchronizer data bus, i.e. dinh(31:0)/douth(31:0) is only connected to the MCA latches DLin and DHin to provide a 64-bit transfer capability, which is required when the Micro Channel 32 is operating in the streaming mode. The dinh/douth lines are always enabled to drive valid voltage levels on to these buses which may be recognized by the corresponding drivers control input being grounded.

As will be explained in more detail below, the data stored in the buffer 70 may be in a 32-bit or a 64-bit format.

The prestorage Eregisters 76 and 78 are connected to the MCA data output latches DLout and DHout of the MCA unit 39, allowing the MCA unit 39 to latch new data from the Micro Channel bus even before the previous data word has been stored in the buffer 70. This allows writing the data from the MCA unit 39 to the SYNC 37 in a time overlapping fashion manner.

The byte enables lines bebin/bebout (3:0) are controlled in the same way as the address lines. However, the byte enable values are stored in the buffer 70 if a write transaction takes place, the byte enable values stored in a register providing an indication of which bytes stored in the register are valid. During read transactions, the byte enable values are stored in the Eregister 88 in the same way as the addresses.

The byte enable storage in the buffer 70 is necessary in 16-bit MCA write cycles. The MCA unit 39 assembles 32-bit words during the write operation and sends them to the SYNC 37 with all byte enables active. However, if the last transfer is just a 16-bit transfer, the byte enables have to be set to the proper value to inform the MIB 40 (FIG. 1) how to store the 16-bit word.

The byte enable path from the MCA unit 39 to the buffer 70 also contains the additional prestorage Eregister 82 for the same reason as for the data path described above. For read cycles this additional stage is bypassed.

The byte enables from the TRACT 35 and MCA unit 39 are combined to one byte enable bus via the two multiplexers 84 and 86, one being connected to the input of the buffer 70 and the other being connected to the external byte enable Eregister 88.

As regards command bus signals, they will also be received from the MCA unit 39. The multiplexer 93 gates the proper command bus signals to the Eregister 94 depending on which block is allowed to send a valid command. The Eregister 94 is clocked whenever a new cycle is started with a valid command signal either from a hostmaster, i.e. CPU 10, or another busmaster.

Command and control bus signals which leave the SYNC 37 are mostly generated by the SYNC state machine 90 in combination with some combinational logic 91, 92, 95.

Since most of the command bus and control bus signals are used by the state machines in the MCA and SYNC units they have to be synchronized before they are used.

The synchronizers 96, 97 comprise two flipflops each. The input flipflop is clocked with the falling edge of the synchronizing clock and the second flipflop is clocked with the rising edge thereof. This synchronizing scheme allows to synchronize signals with a delay of=clock cycle (best case) and 1=clock cycles (worst case).

Figure 6:
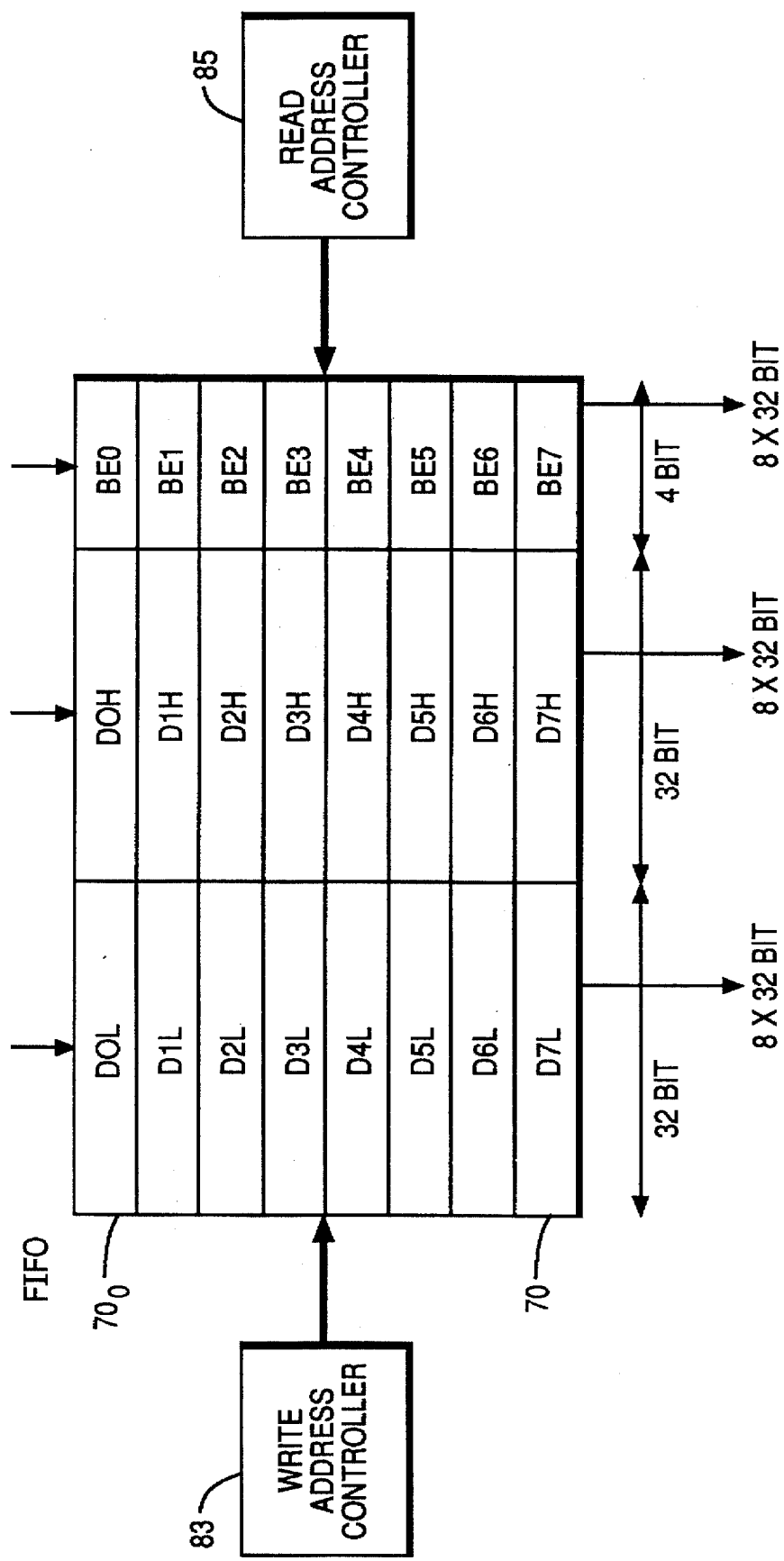
FIG. 6 is a schematic drawing illustrating the principal design of a buffer used with the synchronizer of FIGS. 5A–5B.

Referring now to FIG. 6, the design and function of the buffer 70 will be explained in more detail.

The buffer 70 has a dual ported design and is eight registers deep with a width of each register of 68 bits. In the preferred embodiment, the buffer 70 is implemented by Eregisters (which means registers active when enabled) though other types of memory may also be used. Each register of the buffer 70 has two 32-bit data storage locations, such as DOL and DOH, and a 4-bit section, such as BEO, for the byte enable values. The buffer registers such as $70_o$ are selected by write or read pointer values, the write pointer value being obtained by combining a base address with a variable offset generated by a decoder. As shown in FIG. 6, such an addressing is accomplished with a write address controller 83 and a read address controller 85. Each of the controllers 83 and 85 includes a pointer register, with the write address controller 83 also including an offset decoder for determining the offset value to be added to the base address. This makes it possible to use the buffer 70 as a "sorting memory". In addition to a pointer register, each of the write address controller 83 and the read address controller 85 includes a counter for determining which of the data storage locations of a buffer register pointed to by the relevant pointer register is to be accessed. It should be noted that all write and read actions on the buffer 70 work fully synchronous with the host CPU clock NPCLK of the CPU 10 (FIGS. 1 and 2).

As mentioned before, the "master" for a data transfer may be the host CPU 10 as a "hostmaster" or an MC master device called "busmaster". During hostmaster write cycles the data word size does not exceed 32 bits corresponding to the width of the host P/M bus 20 (FIGS. 1 to 3) and the internal transaction bus TRACT 35 of the BIB 30. If a valid data word is issued on the internal transaction TRACT 35 to the SYNC 37 the data word is written in the DOL register for the first lower 32-bit entry DOL in parallel with the byte enable value which is stored in the BEO register. The DOL location is selected by the write pointer (base address) and an offset value of 0 by the write address controller 83.

The write pointer of the write address controller 83 is locked during the hostmaster write cycles pointing to the first entry in the buffer 70. Thus, only one of the eight buffer registers is used for hostmaster write cycles in which a single data word is transmitted. Nevertheless, the SYNC 37 may accept further data. At the same time when the MCA unit 39 reads the data from the buffer 70 the latter may accept new data from the TRACT 35. Hence, the combination of SYNC 37 and the MCA unit 39 makes up a "2-stage data pipeline" which allows an optimum hostmaster write cycle performance.

The read pointer of the read address controller 85 is also locked during hostmaster write cycles and points to the same register as the write pointer. As soon as the MCA unit 39 receives a start command from the SYNC 37 it takes the data from the buffer 70 and writes it to the selected MCA device.

As regards hostmaster read cycles, they differ from write cycles as follows: A read request is received from the TRACT 35 and the address and the byte enable values are stored in the respective registers and passed to the MCA unit 39.

The writing to the buffer 70 is done in a "read return" procedure storing the valid data in DOL as addressed by the write pointer+offset value=0. As soon as TRACT 35 is free, the data is "read returned" as addressed by the read pointer on to the TRACT 35. During this cycle the SYNC 37 is unable to accept a new command as opposed to the write cycle because it waits for the return of data from the MCA unit 39.

A further type of possible data transfer is a hostmaster BURST mode. A hostmaster BURST read cycle basically starts like a regular hostmaster read cycle.

After the start address has been received by the MCA unit 39, the latter accesses the addressed MCA device and "read returns" four 32-bit words to the buffer 70 or two 64-bit data blocks if the MCA device is operating in a high speed 64-bit streaming mode. If four 32-bit words from the MCA unit 39 are written into the buffer 70 in a regular BURST mode (not streaming mode), these are written in sequence into four separate buffer registers as selected by the write pointer. If two 64-bit data blocks from the MCA unit 39 are written into the buffer 70 in streaming mode, the two blocks are written in sequence into two buffer registers as selected by the write pointer, all the bits making up each block being written simultaneously into the selected buffer register. The order in which the two 32-bit data words making up a 64-bit data block are written into the two data storage locations of the selected buffer register is determined by the counter of the write address controller 83. In a BURST mode, the host processor CPU 10 expects up to four 32-bit data words which in the case of the CPU 10 being an Intel 08486 microprocessor have to be returned in a certain sequence determined by the lower start address bits A(2) and A(3); e.g. for A(3)=1 and A(2)=0 the CPU 10 expects data in the address sequence addr3, addr4, addr1, addr2. If the MCA device delivers the data in a streaming mode comprising 64-bit blocks of data it can only provide it in the regular sequence addr1, addr2, addr3, and addr4. However, the write address controller 83 enables the data words transmitted from the MCA unit 39 in a streaming mode to be written into the buffer 70 in the correct order as required by the host processor CPU 10.

Thus, the data received from the MCA unit 39 is written into the buffer 70 in such a way that it can be read by just incrementing the read pointer, i.e. by reading the contents of the registers of the buffer 70 in a predetermined sequence, with the storage locations of each register also being accessed in a predetermined sequence. This means that the data words are sorted during the "read returns" from the MCA. The buffer register where each data word is stored is addressed by the base write pointer value plus an offset value generated by the decoder contained in the write address controller 83, and is determined by the start address given by the CPU 10.

It should be noted that during a 32-bit read return from the MCA 39 in which no sorting is required the data is written into the first four register locations DOL to D3L by sequentially advancing the write pointer from location DOL to location D3L.

As regards a busmaster write cycle, an MCA master device writes the data into the buffer 70 in a 64-, 32-, 24-, 16-, or 8-bit format. Along with the data the buffer 70 stores the necessary byte enable information. To the SYNC 37 all the writes look like either 32- or 64-bit writes. The MIB 40 (FIGS. 1 and 2) which receives such data determines the data width by checking the byte enable values. These are the same for 64- and 32-bit data because the data is passed in 32-bit words on the TRACT 35 and the host P/M bus 20.

During the single writes to the buffer 70, the registers thereof are always selected by the write pointer value+ offset=0. During a regular 8-, 16-, or 32-bit write only one write operation takes place.

Once a status is reached on the Micro Channel 32 (FIG. 1) which allows the MCA unit 39 to pass the data size and streaming mode information to the SYNC 37, the SYNC 37 starts a "stream write" or a "regular write" to the selected device, such as an MIB 40, on the TRACT 35. The data is taken out of the buffer 70 on to the TRACT 35 under control of the read pointer. The data is selected sequentially. If a 64-bit MC device carries out a write cycle, then the read cycle counter is used in addition to the read pointer to gate the 32-bit data words stored in storage locations of the buffer 70 on to the TRACT 32-bit data bus 35, similar to a burst read operation explained before.

During busmaster read/stream read cycles, the SYNC 37 issues a "burst read" to the TRACT 35 regardless of whether it turns out to be a "regular read" or a "stream read".

The 32-bit data words from the TRACT 35 are written into the buffer 70 in a 64-bit fashion, which means that the first incoming word is gated or demultiplexed to location DOL, the second one to DOH, the third one to D1L, etc. The addressing of the different locations is done with the write pointer+offset=0 in combination with the write cycle counter included in the write address controller 83. This counter locks up the write pointer every other cycle in order to allow writing the higher 32-bit location, such as D2H.

To summarize some of the important features of data transfers from Micro Channel bus to the TRACT bus 35, data may be transferred in single data words, in streams (streaming mode) of single data words (32 bits each), and streams (streaming mode) of double data words (64 bits).

Single data words are transferred through a single data register location with the read/write pointer being locked on that location. Preferably, the storage location is DOL.

When streaming single data words, only the low 32-bit data storage locations DOL, D1L, etc. are used. Depending upon the type of CPU 10 connected to the work station, four sequentially received data bytes are stored in sequential registers DOL, D1L, D2L, D3L, or in non-sequential registers according to one of the following combinations: D1L, DOL, D3L, D2L; or D3L, D2L, D1L, DOL; or D2L, D3L, DOL, D1L. In all cases, data words are transferred from sequential registers DOL, D1L, D2L, D3L to TRACT bus 35.

When streaming double data words, both the low and high data storage locations are used. Again, the type of CPU 10 connected to the work station determines the order in which the data words are stored. The words can be stored in sequential locations DOL, DOH, D1L, D1H or in non-sequential locations DOH, DOL, D1H, D1L; D1L, D1H, DOL, DOH; or D1H, D1L, DOH, DOL. In all cases, data words are transferred from sequential registers DOL, DOH, D1L, D1H to TRACT bus 35.

From the foregoing it may be gathered that the synchronizer SYNC 37 according to the invention is adapted to handle various different data transfer procedures with optimum data transfer performance independent of differences between the frequency of the CPU 10 and the frequency of a Micro Channel device and of the width with which data is presented on the Micro Channel 32.

It should be noted that there is no need for CPU 10 to attend to all details of the above explained operation of the functional block BiB 30. Thus, each functional block is a type of self-contained unit, relieving the CPU 10 of the need to control start of write/read cycles which are performed within the BIB 30 on the TRACT 35.

Specifically, after the CPU sends a command to a functional block the latter performs this command without further control by the CPU. For example, such a command sent to a BIB 30 may be write data from the Micro Channel 32 to DRAM 42, which is carried out under the control of the DMA controller 36. As will be appreciated, each functional block contains the logic and circuitry, such as flipflops, to perform such processes. All this is contained in a so called "state machine" which may be implemented by a skilled person according to the specific requirements and processes to be performed. It should be noted that read and write operations are performed on a master/slave basis in one cycle each with a specific improved performance for read cycles: after a one cycle read request by a master the slave independently returns the requested data in one cycle as soon as it is ready.

Also, it should be noted that in connection with the request/grant procedure of a BIB 30 the bus master function is transferred from the CPU 10 to the BIB 30 which is indicated by a dynamic change of the CTIN(0 . . . 1) signal (FIG. 2) to "11", presented to the MIBs 40 and the BIBs 30 as signal CT(0 . . . 1).

Thus, it will be appreciated that due to the novel architecture of the work station the overall performance is considerably improved by enhancing the operating speed and reducing wait states. Furthermore, standardizing the required functional blocks for use in different configurations including various types of microprocessors and multiple provision of Micro Channel and memory blocks offers considerable cost reductions in production, assembly, and service.

This is particularly true for the work station of the preferred embodiment where each functional block is implemented by one chip, each preferably formed by HCMOS devices. Each chip comprises all subunits, such as registers and logic circuitry required. Though the chips are standardized they may be used in a variety of system configurations since they include ample register space for configuration data such as type of CPU, operating frequency, DRAM memory space and so on.

As an example, the chip may be implemented in an ASIC package using 208 pins which may be easily placed on the system board of the work station.

The detail design of the present invention is captured in CDL, a high level hardware description language. CDL is a software tool which unambiguously defines the hardware for a digital logic system. The attached CDL listing completely defines a preferred embodiment of the present invention. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

It will be clear to those skilled in the art that the present invention is not limited to the specific embodiment disclosed and illustrated herein. Nor is the term "work station" limited to a particular type of computer, but it is to be interpreted in its broadest sense to include any data processing system.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. An interface circuit for transferring data words between first and second buses, comprising:

a buffer having a plurality of registers;

write means, connected to said buffer, for storing data words received from said second bus in said registers; and read means, connected to said buffer, for transferring data words from said registers to said first bus:

wherein each data word is stored in only one register in said buffer, and the order in which the data words are written into said buffer is different than the order in which they are read out of said buffer.

2. An interface circuit according to claim 1 wherein said first bus is x bits wide and said second bus is 2x bits wide.

3. An interface circuit according to claim 2 wherein each register has first and second separately accessible data storage locations and each location has a capacity of x bits.

4. An interface circuit according to claim 3, wherein:

said second bus has a mode of operation in which x-bit data words are transferred serially; and said write means transfers said x-bit data words from said second bus into respective first storage locations of said registers.

5. An interface circuit according to claim 3, wherein:

said second bus has a mode of operation in which two x-bit data words are transferred in parallel;

said write means simultaneously and selectively transfers said two x-bit data words from said second bus into respective first and second or second and first storage locations of a register; and said read means, in transferring data words from sequential registers, transfers data words from the first followed by the second storage location.

6. An interface circuit according to claim 5, further comprising:

a pointer for pointing to a first register and a counter for determining whether said first or said second location of said first register is to be accessed.

7. An interface circuit according to claim 1 wherein said second bus is adapted to transfer a plurality of data words, preceded by a single address word.

8. An interface circuit according to claim 1 wherein said first and second buses operate with different clock frequencies.

9. An interface circuit according to claim 1, wherein said write means is arranged to determine into which register of said buffer a word is to be written by combining a base address with a variable offset number.

10. An interface circuit according to claim 1, wherein:

each data word includes a plurality of bytes; and each register of said buffer includes a section arranged to store byte enable bits which indicate which bytes of data in a register are valid.

11. An interface circuit according to claim 1, further comprising:

first, second and third prestorage registers located between said second bus and said buffer, said first and second prestorage registers being arranged to store two data words to be written into said first and second data storage locations of a selected register of said buffer, and said third prestorage register being arranged to store the byte enable bits which are associated with these two words and which are to be written into the appropriate section of the selected register.

12. An interface circuit according to claim 1, wherein said read and write means transfer single data words between said buses through a predetermined register of said buffer.

13. An interface circuit for transferring data between an x-bit wide first bus and a 2x-bit wide second bus, said buses operating at different frequencies, comprising:

a buffer, connected between said buses, having a plurality of registers, each register having first and second separately accessible data storage locations and each location having a capacity of x bits;

write means for storing data words received from said second bus in said registers; and read means for transferring data words from said registers to said first bus;

wherein each data word is stored in only one register in said buffer, and the order in which the data words are written into said buffer is different than the order in which they are read out of said buffer;

wherein said second bus has a first mode of operation in which x-bit data words are transferred serially, and said write means transfers said x-bit data words from said second bus into respective first storage locations of said registers;

wherein said second bus has a second mode of operation in which two x-bit data words are transferred in parallel, said write means simultaneously and selectively transfers said two x-bit data words from said second bus into respective first and second or second and first storage locations of a register, and said read means, in transferring data words from said registers, transfers data words from the first followed by the second storage location; and wherein said second bus has a third mode of operation in which single data words are transferred, all of such words passing through a predetermined register of said buffer.

14. An interface circuit according to claim 13 wherein in said first and second mode of operation, said second bus is adapted to transfer a plurality of data words, preceded by a single address word.

15. An interface circuit according to claim 14, further comprising:

a pointer for pointing to a selected register; and a counter for determining whether said first or said second location of a selected register is to be accessed in said second mode of operation;

wherein said write means is arranged to determine into which register of said buffer a word is to be written by combining a base address with a variable offset number.

16. An interface circuit according to claim 15, wherein each data word includes a plurality of bytes, and each register of said buffer includes a section arranged to store byte enable bits which indicate which bytes of data in a register are valid, further comprising:

first, second and third prestorage registers located between said second bus and said buffer, said first and second prestorage registers being arranged to store two data words to be written into said first and second data storage locations of a selected register of said buffer, and said third prestorage register being arranged to store the byte enable bits which are associated with these two words and which are to be written into the appropriate section of the selected register.

17. A method for transferring a sequence of data words from a first data bus through a buffer to a second data bus, said buffer having a plurality of registers, comprising:

storing data words received from said first bus in said registers; and transferring data words from said registers to said second bus:

wherein each data word is stored in only one register in said buffer, and the order in which the data words are written into said buffer is different than the order in which they are read out of said buffer.

18. A method according to claim 17, wherein said transfer occurs in a work station having a flexible architecture which is operable with functionally different CPUs, further comprising:

selecting the order of said non-sequential registers from a signal which indicates the type of CPU connected to said work station.

19. A method according to claim 17 wherein said second bus is x bits wide and said first bus is 2x bits wide and wherein each register has first and second separately accessible data storage locations and each location has a capacity of x bits, further comprising:

simultaneously providing two x-bit data words on said first bus; and simultaneously transferring said two words into selected first and second or second and first storage locations of a register.

* * * * *